June 20, 1967  R. G. PARKISON  3,326,242
FLUID FLOW CONTROL DEVICE
Filed May 20, 1964
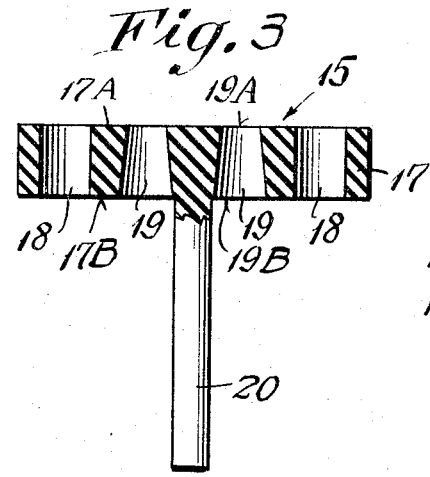
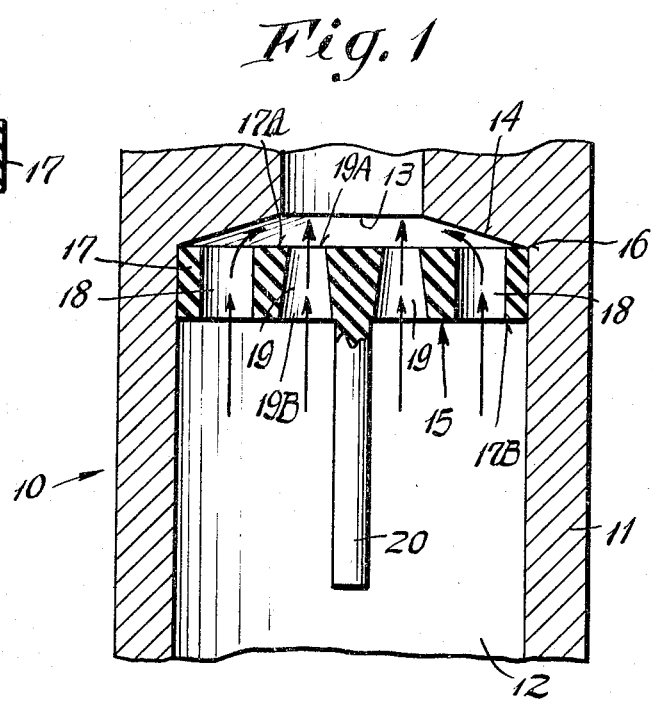
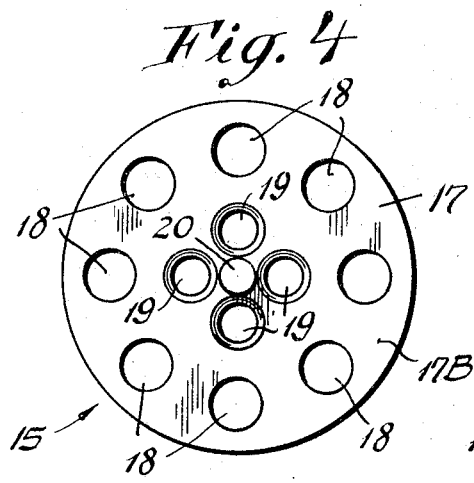
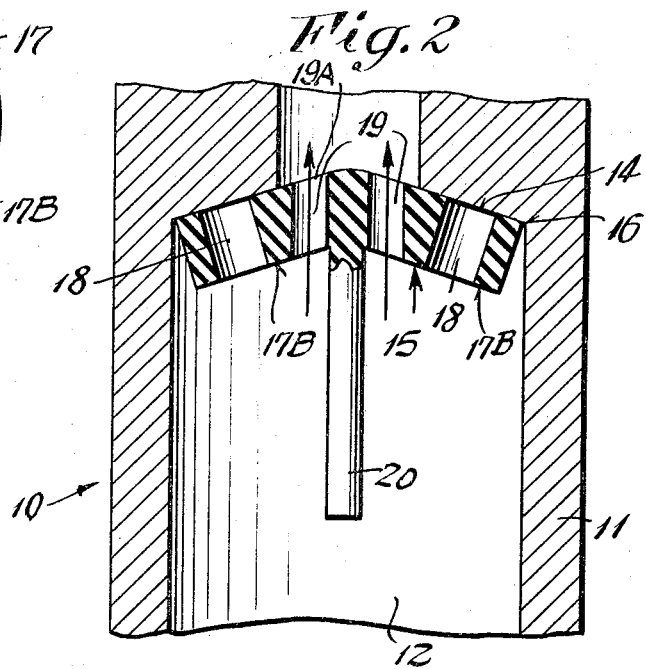
INVENTOR.
Richard G. Parkison
BY Frank G. Gordon
ATTORNEY INVENTOR
Richard G. Parkison
BY
ATTORNEY

United States Patent Office 3,326,242
Patented June 20, 1967

3,326,242
FLUID FLOW CONTROL DEVICE
Richard G. Parkison, Louisville, Ky., assignor to American Radiator & Standard Sanitary Corporation, New York, N.Y., a corporation of Delaware
Filed May 20, 1964, Ser. No. 368,887
6 Claims. (Cl. 138—46)

This invention relates in general to a fluid flow control device, and more specifically to a pressure responsive control device for regulating fluid flow in a silent manner.

In many fluid flow systems, as for example, in the flow system of a water closet and the like, it is desirable to provide a relatively unrestricted flow of fluid at low operating pressure and to progressively restrict fluid flow to a substantially constant level at medium and high operating pressures and to do so at a very low noise level. Heretofore, many efforts have been made to develop a flow device to restrict fluid flow at elevated pressures. However, the known flow devices proved unsatisfactory because of the vibration and resultant high noise level with which they operated at high inlet pressures.

Therefore, an object of this invention is to provide a flow control device which will automatically restrict the flow of fluid therethrough at elevated pressures in a very silent manner.

Another object is to provide a flow control device which will silently and progressively restrict the flow of fluid therethrough in accordance with the amount of pressure acting thereon.

It is another object to provide a flow control device for producing relatively unrestricted fluid flow at low operating pressures and which will progressively restrict fluid flow in a very silent manner as pressure increases.

Still another object is to provide a flow control device for restricting and silencing the flow therethrough as pressure increases, and which is also capable of functioning as a strainer to prohibit the passage of large particles therethrough.

Still another object is to provide an improved silencing flow restrictor or washer constructed and arranged so as to be rendered self-cleaning in operation.

The foregoing objects and other features and advantages are attained by a flow control device adapted for use in a fluid flow system for restricting and silencing the flow of fluid therethrough in the upper operating pressure range thereof. The flow control device comprises a seat forming member having an opening therein defined by a frusto-conical surface converging in the direction of flow therethrough, and a fluid flow restrictor disposed in the seat member on the upstream side of the opening. In accordance with this invention, the flow restrictor is constructed and arranged to provide relatively unrestricted flow in the lower operating pressure range thereof and to progressively restrict fluid flow in a very silent manner as pressure of the fluid thereon is increased. This is attained in one embodiment of the invention by forming the restrictor of a resilient material which is free to flex under pressure, and which has extending therethrough a plurality of orifice openings or holes. Certain of the orifice openings are arranged in the marginal portion of the restrictor that extends beyond the circumference of the seat opening. The arrangement is such that upon the flexing of the restrictor under increasing pressure, the flow therethrough is progressively restricted until in the maximum flexed position the marginally disposed orifice openings are closed by the frusto-conical surface defining the seat opening. Other orifice openings, formed in the resilient member, are centrally disposed within the diameter or circumference of the seat opening, thus permitting fluid flow therethrough under all operating pressures.

In accordance with one embodiment of this invention, the silencing of the fluid through the orifice openings at the elevated pressures, is attained by constructing the centrally disposed orifice openings with normally tapering side wall portions that converge in the direction of flow therethrough. Accordingly, as the restrictor is flexed as pressure thereon is increased, the conically shaped orifice openings will deform and assume a generally cylindrical cross-section thereby quieting of the fluid flow therethrough.

A feature of one embodiment of this invention is the provision of a resilient flow restrictor having formed therein two distinct groupings of orifice openings, one group for progressively restricting the flow of fluid therethrough at elevated inlet pressures, and the other group specifically constructed for quieting the fluid flow therethrough at such elevated inlet pressures.

Another feature of this invention resides in the provision of a flow restrictor that is relatively simple in construction, simple to fabricate and positive in operation. Other features and advantages of the invention will become more readily apparent when considered in view of the drawings and the detailed description thereof in which, FIGURE 1 illustrates a sectional side view of a flow control device of the instant invention shown in its low inlet pressure operating position.

FIGURE 2 illustrates a view similar to that of FIG. 1 but showing the same in its high inlet pressure operating position.

FIGURE 3 is a detail side view of the flow restrictor of the instant invention having parts thereof shown in section.

FIGURE 4 is a bottom plan view of FIG. 3.

Figure 5:
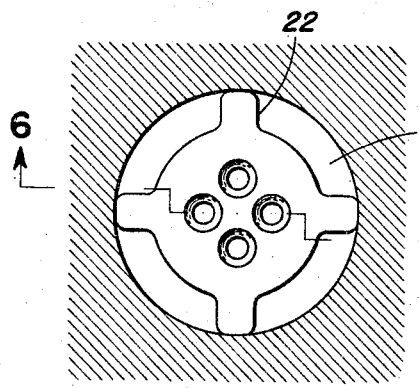
FIGURE 5 illustrates a view of an alternate embodiment of the invention.

Referring to the drawings, there is shown in FIGS. 1 and 2 a flow control device 10 applicable for use in a fluid flow system, as for example, in a water closet or the like where it is desired to provide relatively very little restriction to the flow at low inlet pressure, and to restrict the flow to a substantially constant level at medium and high pressure. As shown, the flow control device 10 comprises a seat member 11 which is defined by a conduit having a cylindrical bore or passageway 12 for accommodating a flow of fluid. The bore or passageway 12 extends to a reduced opening 13 which is defined by a tapering or frusto-conical surface 14 converging in the direction of fluid flow therethrough.

A flow restrictor or silencing washer 15 is seated on the upstream side of the opening 13 on the shoulder 16 defined at the intersection of the tapering surface 14 and the cylindrical wall portion of the passageway 12.

The flow restrictor or washer 15 comprises essentially of a disc shaped member 17 formed of a resilient material such as for example, rubber or the like, having a hardness which will permit it to flex under the action of fluid pressure acting thereon in accordance with a predetermined ratio. Accordingly, the disc 17 is provided with a circumference permitting it to be snugly received within the bore 12. The restrictor 15 is provided with opposed smooth flat face surfaces 17A, 17B and is normally disposed in the seat member 11 with its downstream surface 17A spaced from the tapering surface 14 of the seat member.

In accordance with this invention, the restrictor or silencing washer 15 is provided with a plurality of orifice openings 18, 19 disposed in spaced concentric rings to define an inner and outer ring of orifice openings. Accordingly, the orifice openings 18 of the outer ring are arranged in the marginal portion of the restrictor washer 15 which extend beyond or radially outwardly of the circumference of the seat opening 13. See FIGS. 1 and 2. The orifice openings 19 of the inner ring in turn are clustered about the central axis of the restrictor to confine the orifice openings 19 within the circumference defined by the seat opening 13. In the illustrated embodiment, eight outer orifice openings 18 are circumferentially spaced about the outer ring, each of which are formed with a substantially cylindrical cross-section. The inner ring of orifice openings 19 include four equidistantly spaced openings. In accordance with the instant invention, each of the respective openings 19 of the inner ring are normally defined by frusto-conical surfaces which taper or converge in the direction of fluid flow therethrough. See FIGS. 1 and 3. While the illustrated embodiment depicts a specific number of openings in the respective rings of openings, it will be understood that the number and size of orifice openings 18, 19 can be varied depending upon the particular design consideration of a given application. If desired, the flow restrictor 15 may be provided with an integrally formed stem or handle 20 by which it may be grasped to facilitate the handling and positioning of the same within the seat member.

The operation of the flow control device as described is as follows:

At low pressure, that is at operating pressures below that which will cause the flow restrictor 15 to flex, the fluid is permitted to flow through each of the orifice openings 18, 19 formed therein as indicated in FIG. 1. Thus, at such low operating pressure, relatively unrestricted flow of fluid is permitted to flow through the flow restrictor 15.

As the fluid pressure on the flow restrictor 15 is increased, the pressure acting thereon will cause the same to be flexed in accordance with the predetermined hardness thereof in the direction of flow as indicated in FIG. 2. Thus, as the pressure of the fluid increases, the flow restrictor will progressively flex or concave causing the flow through the outer orifices 18 to be progressively restricted as the downstream surface 17A of the washer approaches the frusto-conical surface 14 until at maximum pressure, the orifices 18 of the outer ring are completely shut off as the increasing pressure forces the restrictor 15 into contact with the inclined surface 14 of the seat member 12. In this position, the flow of fluid is limited to the inner ring of orifices opening 19 thus providing for a restricted substantially constant flow at the upper limits of operating pressure.

In accordance with this invention, silencing of the fluid flow at medium and elevated pressure is affected due to the specific structural transformation which occurs in the shape of the orifice openings 19. As shown in FIG. 1, at relatively low pressure, the cross-sectional shape of the openings 19 on the inner ring is normally that of a frusto-conical section converging in the direction of flow of fluid therethrough. Thus, as the increasing pressure acting on the inlet side 17B of the flow restrictor 15 causes the flow restrictor to flex or concave in the direction of seat 14, the small end 19A of openings 19 on the downstream side 17A of the restrictor tend to enlarge, and the large inlet end 19B of openings 19 on the upstream side 17B tend to restrict. Thus it will be noted that the flexing of the washer 15 under pressure will transform the cross-sectional shape of the orifice opening 19 causing the same to assume a substantially cylindrical cross-sectional shape and thus quiet the flow therethrough. The orifice openings 19 may have a slight radius on their entrance side thereby providing a rounded entrance which contributes to silencing.

Thus, it will be readily apparent that the construction and operation of the instant flow restrictor or silencing washer 15 is such that the flow of fluid therethrough is progressively decreased as the pressure acting on the restrictor 15 is increased to a point where at maximum pressure operation, the flow of fluid therethrough is maintained at a restricted substantially constant level. Silencing is affected by causing the normal frusto-conical shape of the orifices 19 of the inner ring to transform at medium to high pressure operations to a substantially cylindrical shape to enhance quieting of the fluid flow therethrough.

Further the arrangement of the orifice openings 18, 19 in the surface of the restrictor or washer 15 permits the same to function as a strainer, and prohibits the passage of large particles therethrough.

Another aspect of the arrangement resides in the provision that the flexing of the restrictor 15 under changing pressure conditions renders the orifice openings 19 self-cleaning.

Figure 6:
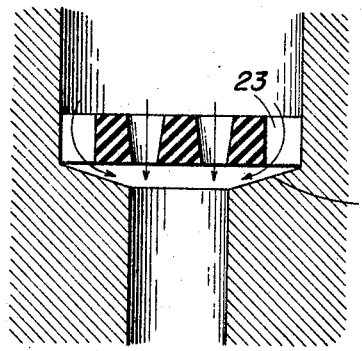
FIGURE 6 is a view taken along the line 6—6 of FIG. 5.

An alternate construction is shown in FIGS. 5 and 6 in which fingers 22 are used in place of the outer row of orifices. The spaces 23 between the fingers 22 form an opening for the passage of water when the washer is in an unflexed position (FIG. 6) but these openings 23 are closed by the seat 21 when the washer is flexed to a position analogous to FIG. 2.

Figure 7:
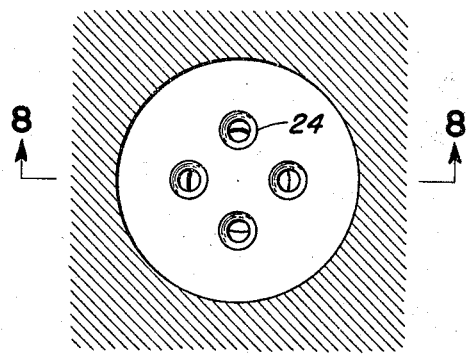
FIGURE 7 illustrates a view of another alternate embodiment.
Figure 8:
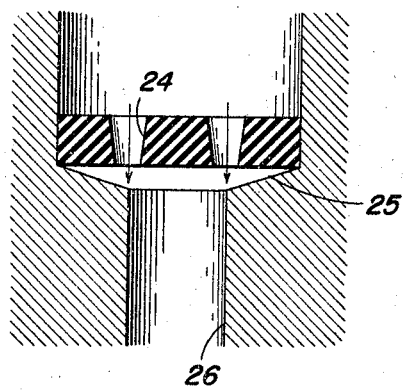
FIGURE 8 is a view taken along the line 8—8 of FIG. 7.

In a further embodiment, a single cluster of orifices 24 (FIGS. 7 and 8) may be disposed to intersect the circle defined by the inner diameter of seat 25. With this construction, flexing of the washer to a position analogous to FIG. 2 will close only that portion of the orifices 24 which engage the seat 25 while that portion inboard of the seat 25 will continue to conduct fluid.

Figure 9:
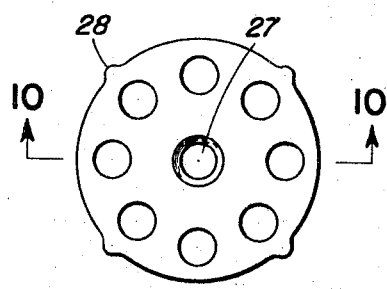
FIGURE 9 illustrates a view of a further alternate embodiment.
Figure 10:
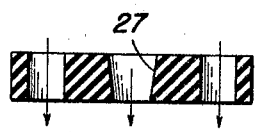
FIGURE 10 is a view taken along the line 10—10 of FIG. 9.

As a further alternate embodiment, the inner ring of orifice openings 19 in the embodiment of FIGS. 1 to 4 may be replaced by single central orifice 27 as shown in FIGS. 9 and 10. Also, if desired, small nibs 28 may be provided on the washer to aid in keeping the latter positioned in place.

While the instant invention has been described with reference to a particular embodiment thereof, it will be readily appreciated and understood that variations and modifications thereof may be made without departing from the spirit or scope of the invention.

What is claimed is:

1. A fluid flow control device for restricting and silencing the flow of fluid therethrough comprising,
  (a) a seat member having an opening therein defined by a frusto-conical surface converging in the direction of fluid flow therethrough;
  (b) a resilient fluid flow restrictor disposed in said seat member on the upstream side of the opening;
  (c) said restrictor having an outer set of orifices and and inner set of orifices, and
  (d) said inner set of orifices being defined by frusto-conical surfaces which taper in the direction of fluid flow therethrough and adapted to assume under increasing pressure a generally cylindrical shape thereby silencing the fluid flow therethrough.

2. The control device of claim 1 wherein said restrictor is provided with nibs at an outer edge for positioning said restrictor in said seat member.

3. The control device of claim 1 wherein the orifice openings are disposed in spaced concentric rings to define an inner and outer ring of orifice openings.

4. The control device of claim 3 wherein the orifice openings in said outer ring are disposed in the marginal portion of said restrictor extending beyond the circumference of said seat opening.

5. The control device of claim 3 wherein the orifice openings in the outer ring are substantially cylindrical in cross-section.

6. The control device of claim 3 wherein the orifice openings of said inner ring are disposed about a central portion of said restrictor within the circumference of said seat opening.

References Cited

UNITED STATES PATENTS

| | | | |
|---|---|---|---|
| 2,851,060 | 9/1958 | Fleischer et al. | 138—146 |
| 2,891,578 | 6/1959 | Dahl et al. | 138—45 |
| 2,936,790 | 5/1960 | Dahl et al. | 138—45 X |
| 3,006,378 | 10/1961 | Erickson et al. | 138—46 |
| 3,141,477 | 7/1964 | Campbell et al. | 138—45 |

LAVERNE D. GEIGER, *Primary Examiner.*

C. L. HOUCK, *Assistant Examiner.*